(12) United States Patent
Selvaganapathy et al.

(10) Patent No.: US 12,507,135 B2
(45) Date of Patent: Dec. 23, 2025

(54) DUAL CONNECTIVITY SCENARIO FOR COORDINATED LEAVE

(71) Applicant: Nokia Technologies Oy, Espoo (FI)

(72) Inventors: Srinivasan Selvaganapathy, Bangalore (IN); Faranaz Sabouri-Sichani, Aalborg (DK); Laura Luque Sanchez, Nibe (DK); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 18/040,702

(22) PCT Filed: Aug. 5, 2021

(86) PCT No.: PCT/EP2021/071826
§ 371 (c)(1),
(2) Date: Feb. 6, 2023

(87) PCT Pub. No.: WO2022/037948
PCT Pub. Date: Feb. 24, 2022

(65) Prior Publication Data
US 2023/0292193 A1    Sep. 14, 2023

(30) Foreign Application Priority Data

Aug. 17, 2020    (IN) .............................. 202041035389

(51) Int. Cl.
*H04W 36/00* (2009.01)
*H04W 36/36* (2009.01)
*H04W 76/34* (2018.01)
*H04W 36/14* (2009.01)

(52) U.S. Cl.
CPC ..... *H04W 36/0069* (2018.08); *H04W 36/362* (2023.05); *H04W 76/34* (2018.02); *H04W 36/144* (2023.05)

(58) Field of Classification Search
CPC ........... H04W 36/0069; H04W 36/362; H04W 76/34; H04W 36/144; H04W 8/183; H04W 76/36; H04W 76/16; H04W 76/15
See application file for complete search history.

(56) References Cited

U.S. PATENT DOCUMENTS

| 2019/0191345 A1 | 6/2019 | Yamada |
| 2019/0268905 A1 | 8/2019 | Zhou et al. |
| 2020/0029389 A1 | 1/2020 | Yilmaz et al. |

(Continued)

FOREIGN PATENT DOCUMENTS

| WO | 2019/066707 A1 | 4/2019 |
| WO | 2020/017886 A1 | 1/2020 |

(Continued)

OTHER PUBLICATIONS

Office Action received for corresponding Japanese Patent Application No. 2023-512071, dated Apr. 16, 2024, 5 pages of Office Action and 10 pages of summary and translation available.

(Continued)

*Primary Examiner* — Kibrom T Hailu
(74) *Attorney, Agent, or Firm* — Barta Jones, PLLC

(57) ABSTRACT

Dual SIM operations with one SIM configured for Multi-radio dual connectivity. On request of a first SIM, the second SIM with dual connectivity, releases one of the two connections, by issuing an appropriate request to the network node.

2 Claims, 4 Drawing Sheets

(56) References Cited

U.S. PATENT DOCUMENTS

| | | | |
|---|---|---|---|
| 2020/0178137 A1 | 6/2020 | Hassan Hussein et al. | |
| 2021/0227623 A1* | 7/2021 | Park | H04W 88/08 |
| 2021/0274587 A1* | 9/2021 | Jung | H04W 76/15 |
| 2021/0337615 A1* | 10/2021 | Rugeland | H04W 76/27 |

FOREIGN PATENT DOCUMENTS

| | | |
|---|---|---|
| WO | 2020/045952 A1 | 3/2020 |
| WO | 2020/096396 A1 | 5/2020 |

OTHER PUBLICATIONS

Office action received for corresponding Indian Patent Application No. 202347016908, dated Feb. 6, 2024, 6 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"Revised SID: Study on system enablers for multi-SIM devices", TSG SA Meeting #SP-83, SP-190248, Agenda Item: 178.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"New WID: Support for Multi-SIM devices in Rel-17", 3GPP TSG RAN Meeting #86, RP-193263, Agenda Item: 9.1.2, vivo, Dec. 9-12, 2019, 5 pages.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.1.0, Mar. 2020, pp. 1-74.

Yilmaz et al., "Overview of LTE-NR Dual Connectivity", IEEE Communications Magazine, vol. 57, No. 6, Jun. 2019, pp. 138-144.

"3rd Generation Partnership Project; Technical Specification Group Services and System Aspects; Study on system enablers for devices having multiple Universal Subscriber Identity Modules (USIM) (Release 17)", 3GPP TR 23.761, V0.4.0, Jun. 2020, pp. 1-78.

International Search Report and Written Opinion received for corresponding Patent Cooperation Treaty Application No. PCT/EP2021/071826, dated Nov. 15, 2021, 13 pages.

"Considerations for Multi-SIM WI Objectives", 3GPP TSG-RAN WG2 Meeting #111 electronic, R2-2006916, Agenda Item: 8.3, Charter Communications, Aug. 17-28, 2020, 5 pages.

"Paging Reception for Musim", 3GPP TSG-RAN WG2 Meeting #111 Electronic, R2-2007352, Agenda Item: 8.3, Nokia, Aug. 17-28, 2020, 3 pages.

"Support for Multi-SIM Devices", 3GPP TSG-RAN WG2 Meeting #111 electronic, R2-2007191, Agenda Item: 8.3, MediaTek Inc, Aug. 17-28, 2020, 6 pages.

Office action received for corresponding European Patent Application No. 21755469.0, dated Feb. 5, 2025, 4 pages.

\* cited by examiner

DUAL CONNECTIVITY SCENARIO FOR COORDINATED LEAVE

RELATED APPLICATION

This application claims priority to PCT Application No. PCT/EP2021/071826, filed on Aug. 5, 2021, which claims priority to IN application No. 202041035389, filed on Aug. 17, 2020, each of which is incorporated herein by reference in its entirety.

FIELD OF THE DISCLOSURE

Various example embodiments relate to an apparatus for a terminal device comprising at least one processor.

Further embodiments relate to a method of operating a terminal device.

Further embodiments relate to an apparatus for a network device comprising at least one processor.

Further embodiments relate to a method of operating a network device.

BACKGROUND

Wireless communications systems may e.g. be used for wireless exchange of information between two or more entities, e.g. comprising one or more terminal devices, e.g. user equipment, and one or more network devices such as e.g. base stations.

Some terminal devices may have two or more, e.g. simultaneous, network subscriptions, e.g. with multiple corresponding International Mobile Subscriber Identities (IMSI) at EPS (Evolved Packet System) or Subscription Permanent Identifier (SUPI) at 5GC (fifth generation core), each associated with a particular Universal Subscriber Identity Module (USIM) belonging to a same or different Mobile Network Operator (MNO) or Mobile Network Virtual Operator (MNVO). Such terminal devices may be denoted as multiple USIM, MUSIM, devices.

Some terminal devices are capable of Multi-Radio Dual Connectivity (MR-DC), which is a Dual Connectivity between E-UTRA (Evolved Universal Terrestrial Radio Access) and (5G) NR (New Radio) nodes, or between two NR nodes. MR-DC is possible with both EPC (Evolved Packet Core) and 5GC. Four variants of MR-DC are: EN-DC, NGEN-DC, NE-DC and NR-DC.

Regarding MR-DC with EPC, E-UTRAN supports MR-DC via E-UTRA-NR Dual Connectivity (EN-DC), in which a user equipment (UE) is connected to one eNB (eNodeB) that acts as a master node (MN) and to one en-gNB that acts as a secondary node (SN). The eNB is connected to the EPC via the S1 interface and to the en-gNB via the X2 interface. The en-gNB might also be connected to the EPC via the S1-U interface and other en-gNBs via the X2-U interface.

Regarding MR-DC with 5GC, E-UTRA-NR Dual Connectivity (NGEN-DC) is defined, in which a UE is connected to one ng-eNB that acts as a MN and one gNB that acts as a SN. Further, NR-E-UTRA Dual Connectivity (NE-DC) is defined, in which a UE is connected to one gNB that acts as a MN and one ng-eNB that acts as a SN. Further, NR-NR Dual Connectivity (NR-DC) is defined, in which a UE is connected to one gNB that acts as a MN and another gNB that acts as a SN.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus, comprising at least one processor, and memory storing instructions that, when executed by the at least one processor, cause a terminal device, which is configured to support multi-radio dual connectivity with at least two different connections at least to: transmit to a network device a coordinated leave information indicating that at least one of the two different connections should be released.

In some embodiments, the coordinated leave information indicates to the network device that at least one of the two different connections should be suspended.

In some embodiments, transmitting the coordinated leave information to the network device is used to free at least one transceiver resource of the terminal device.

In some embodiments, transmitting the coordinated leave information to the network device is used to temporarily free at least one transceiver resource of the terminal device.

In some embodiments, the apparatus may be an apparatus for a wireless communications system.

In some embodiments, the apparatus or its functionality, respectively, may be provided in a terminal device of the communications system, for example in a user equipment (UE).

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN or 5G NR (fifth generation new radio) or other radio access technology. In some embodiments, the apparatus according to the embodiments or its functionality, respectively, may be used for MR-DC, e.g. at least one of EN-DC, NGEN-DC, NE-DC and NR-DC.

In some embodiments, the terminal device may have several transceiver resources, which may be in use, e.g. in a dual connectivity configuration. In some embodiments, it may be desirable to release at least one of the several transceiver resources, for example to enable a further (e.g., second) connection, e.g. further USIM connection. In some embodiments, the terminal device may use the coordinated leave information according to the embodiments to inform the network that it is desirable to release at least one of the several transceiver resources, thus e.g. enabling to perform a coordinated leave.

According to some embodiments, the instructions, when executed by the at least one processor, further cause the terminal device to use, for transmitting the coordinated leave information, at least one of: a radio resource control (RRC) message, a secondary cell group failure information message ("SCG-Failure-Information"), e.g. a SCG failure information according to some accepted specifications.

According to some embodiments, when using the SCG failure information message according to some accepted specifications, a cause value characterizing the coordinated leave may be defined, which may e.g. be included in the SCG failure information. According to some embodiments, the terminal device need not include any measurement in the SCG failure information message according to some accepted specifications, as the SCG failure information message is used for indicating the coordinate leave purpose, and not as an indication of link deterioration, e.g. of a secondary cell group.

According to some embodiments, the instructions, when executed by the at least one processor, further cause the terminal device to receive a first configuration information, e.g. from a network device, e.g. a master node, characterizing a reconfiguration of a bearer associated with the terminal device.

According to some embodiments, the network node, e.g. master node, may trigger a bearer remapping, i.e. "pull back", e.g. of secondary cell group (SCG) bearers to master cell group, MCG, e.g., single connectivity, to avoid interruption of an ongoing service.

According to some embodiments, the network node, e.g. master node, may additionally suspend the secondary cell group.

According to some embodiments, the instructions, when executed by the at least one processor, further cause the terminal device to receive a second configuration information instructing the terminal device to suspend at least one bearer associated with a master cell group, and to suspend the at least one bearer associated with the master cell group based on the second configuration information.

According to some embodiments, the network element, e.g. master node, may not be able to perform a bearer remapping, e.g. due to resource constraints (or priority traffic expected on the secondary cell group and/or any other network internal reason). According to some embodiments, the network element, e.g. master node, may, e.g. instead of the bearer remapping, indicate the terminal device to continue with the secondary cell group of a current EN-DC connection with the master cell group being suspended.

According to some embodiments, the instructions, when executed by the at least one processor, further cause a first subscriber identity module of the terminal device to perform at least one of a) transmit a resource release request to a second subscriber identity module of the terminal device, b) receive a resource release confirmation from the second subscriber identity module of the terminal device.

According to some embodiments, the terminal device may, upon receipt of the resource release request to the second subscriber identity module of the terminal device, transmit the coordinated leave information according to the embodiments.

According to some embodiments, the terminal device may, upon receipt of the first configuration information, transmit the resource release confirmation to the first subscriber identity module of the terminal device, e.g. signaling that the respective resources have been released and may e.g. be used by the first subscriber identity module.

Further embodiments relate to a method of operating a terminal device, e.g. UE, which is configured to support multi-radio dual connectivity, MR-DC, with at least two different connections, comprising: transmitting to a network device, e.g. a master node, a coordinated leave information indicating that at least one of the two different connections should be released.

Further embodiments relate to an apparatus comprising means for causing a terminal device, e.g. UE, which is configured to support multi-radio dual connectivity, MR-DC, with at least two different connections at least to: transmit to a network device, e.g. a master node, a coordinated leave information indicating that at least one of the two different connections should be released.

Further embodiments relate to an apparatus, comprising at least one processor, and memory storing instructions that, when executed by the at least one processor, cause a network device, e.g. master node, at least to: receive a coordinated leave information indicating that at least one of two different connections of a terminal device, which is configured to support multi-radio dual connectivity with the least two different connections, should be released.

According to some embodiments, the instructions, when executed by the at least one processor, further cause the network device to: determine, whether bearers associated with a secondary cell group can be remapped to a master cell group, and, based on the determination, transmit to the terminal device a first configuration information characterizing a reconfiguration of a bearer associated with the terminal device or a second configuration information instructing the terminal device to suspend at least one bearer associated with a master cell group.

According to some embodiments, the instructions, when executed by the at least one processor, further cause the network device to: notify a handover target on a coordinated leave condition of the terminal device based on the coordinated leave information. As an example, according to some embodiments, when the secondary cell group resources are relinquished, and if the master node undergoes a handover, e.g. as a result of the master node layer mobility, while the secondary cell group is suspended for the coordinated leave according to some embodiments, the (source) master node may inform and/or instruct the target master node of the handover to avoid a secondary cell group configuration during an inter-master node mobility execution, e.g. until the coordinated leave condition based on the coordinated leave information is revoked (e.g., a prohibition of not having secondary cell group resources for dual connectivity is active).

Further embodiments relate to a method of operating a network device, e.g. master node, comprising: receiving a coordinated leave information indicating that at least one of two different connections of a terminal device, which is configured to support multi-radio dual connectivity with the least two different connections, should be released.

Further embodiments relate to a system comprising at least one apparatus for a terminal device according to the embodiments and at least one apparatus for a network device according to the embodiments.

DESCRIPTION OF SOME EMBODIMENTS

Figure 1:
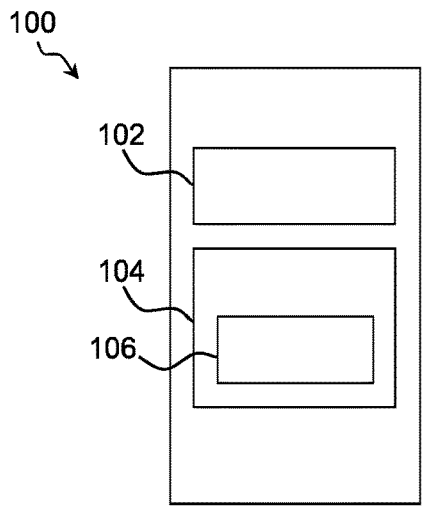
FIG. 1 schematically depicts a simplified block diagram of an apparatus according to some embodiments, FIG. 2 schematically depicts a simplified block diagram of an apparatus according to some embodiments, FIG. 3 schematically depicts a simplified block diagram of a system according to some embodiments, FIG. 4 schematically depicts a simplified flow-chart according to some embodiments, FIG. 5 schematically depicts a simplified flow-chart according to some embodiments, FIG. 6 schematically depicts a simplified flow-chart according to some embodiments, FIG. 7 schematically depicts a simplified flow-chart according to some embodiments, FIG. 8 schematically depicts a simplified flow-chart according to some embodiments, FIG. 9A schematically depicts a simplified flow-chart according to some embodiments, FIG. 9B schematically depicts a simplified flow-chart according to some embodiments, FIG. 10 schematically depicts a simplified block diagram of an apparatus according to some embodiments, FIG. 11 schematically depicts a simplified block diagram of an apparatus according to some embodiments, FIG. 12 schematically depicts a simplified signaling chart according to some embodiments, and FIG. 13 schematically depicts a simplified signaling chart according to some embodiments.
Figure 4:
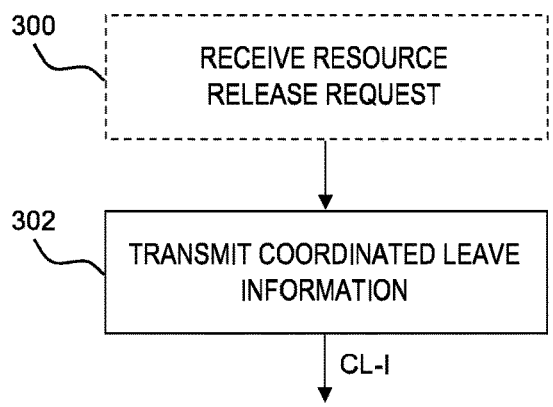

Some embodiments relate to an apparatus, e.g. for a terminal device of a wireless communications system. FIG. 1 schematically depicts a simplified block diagram of the apparatus 100 according to some embodiments, and FIG. 4 schematically depicts a simplified flow chart of a method of operating the apparatus 100 according to some embodiments.

Figure 3:
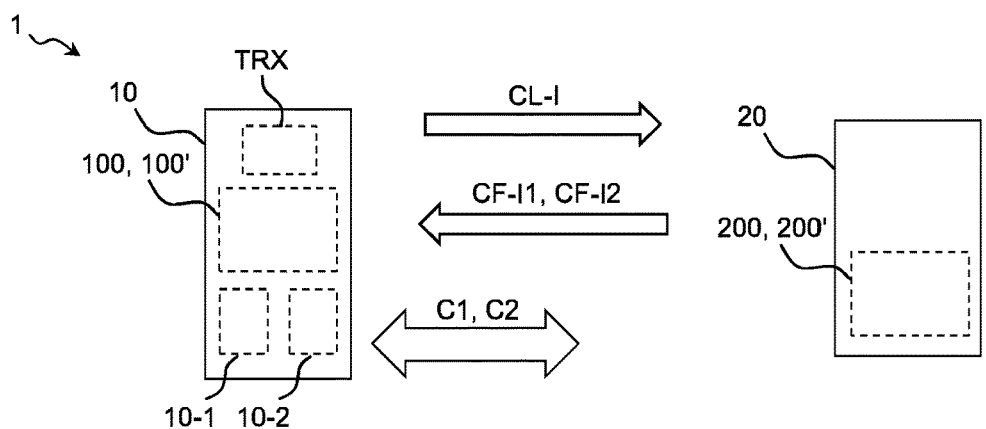

The apparatus 100 (FIG. 1) comprises at least one processor 102, and memory 104 storing instructions 106 that, when executed by the at least one processor 102, cause a terminal device 10, see for example FIG. 3, which is configured to support multi-radio dual connectivity with at least two different connections C1, C2 at least to: transmit 302 (FIG. 4) to a network device 20 (FIG. 3) a coordinated leave information CL-I indicating that at least one of the two different connections C1, C2 should be released.

In some embodiments, the apparatus 100 or its functionality, respectively, may be provided in a terminal device 10 of the communications system 1 (FIG. 3), for example in a user equipment (UE).

In some embodiments, the apparatus 100 according to the embodiments or its functionality, respectively, may be used for or within wireless communications systems 1, e.g. networks, based on or at least partially adhering to third generation partnership project, 3GPP, radio standards such as 4G E-UTRAN or 5G NR (fifth generation new radio) or other radio access technology.

In some embodiments, the apparatus 100 according to the embodiments or its functionality, respectively, may be used for MR-DC, e.g. at least one of EN-DC, NGEN-DC, NE-DC and NR-DC, and/or for other types of multi-radio dual connectivity.

In some embodiments, the terminal device 10 may have several transceiver resources TRX, which may be in use, e.g. in a dual connectivity configuration.

In some embodiments, the terminal device 10 may have several Universal Subscriber Identity Modules (USIMs) 10-1, 10-2.

In some embodiments, the terminal device 10 may share several transceiver resources TRX, e.g. by the Universal Subscriber Identity Modules (USIMs) 10-1, 10-2.

In some embodiments, at least some of the several transceiver resources TRX may e.g. be configured for dual connectivity. In some embodiments, at least some of the several transceiver resources TRX may e.g. be shared across the Universal Subscriber Identity Modules (USIMs) 10-1, 10-2. In some embodiments, the transceiver resources TRX may either be configured for dual connectivity or may be shared across the Universal Subscriber Identity Modules (USIMs) 10-1, 10-2.

In some embodiments, the first connection C1 may e.g. be a connection with a master node of an EN-DC configuration using a master cell group. In some embodiments, the second connection C2 may e.g. be a connection with a secondary node of the EN-DC configuration using a secondary cell group. In other words, according to some embodiments, the first connection C1 may represent an MCG leg of the MR-DC radio connections, and the second connection C2 may represent an SCG leg of the MR-DC radio connections.

In some embodiments, the first connection C1 and/or the second connection C2 is not limited to a respective physical connection, but may e.g. also comprise a logical connection or logical connections, respectively.

In some embodiments, the coordinated leave information CL-I indicates to the network device 20 that at least one of the two different connections C1, C2 should be suspended.

In some embodiments, the coordinated leave information CL-I indicates to the network device 20 that a secondary cell group associated with at least one of the two different connections C1, C2 should be suspended.

In some embodiments, transmitting 302 the coordinated leave information CL-I to the network device 20 is used to free at least one transceiver resource TRX of the terminal device 10.

In some embodiments, transmitting 302 the coordinated leave information CL-I to the network device 20 is used to temporarily free at least one transceiver resource TRX of the terminal device 10.

In some embodiments, e.g. due to a shared usage of the several transceiver resources TRX, it may desirable to release at least one of the several transceiver resources TRX, for example to enable a further (e.g., second) connection, e.g. further USIM connection. In some embodiments, the terminal device 10 may use the coordinated leave information CL-I according to the embodiments to inform the network, e.g. via the network device 20, that it is desirable to release at least one of the several transceiver resources TRX, thus e.g. enabling to perform a coordinated leave.

In some embodiments, the terminal device 10, e.g. a second USIM 10-2 (FIG. 3) of the terminal device 10, may receive 300 (FIG. 4) a resource release request, e.g. from a first USIM 10-1 of the terminal device 10, indicating that it is desirable to release at least one of the several transceiver resources TRX. In some embodiments, the terminal device 10 may transmit the coordinated leave information CL-I, block 302 of FIG. 4, after receiving 300 the resource release request.

According to some embodiments, the instructions 106 (FIG. 1), when executed by the at least one processor 102, further cause the terminal device 10 (FIG. 3) to use, for transmitting 302 (FIG. 4) the coordinated leave information CL-I, at least one of: a radio resource control message, a secondary cell group failure information message ("SCG-Failure-Information"), e.g. a SCG failure information according to some accepted specifications.

According to some embodiments, when using the SCG failure information message according to some accepted specifications, a cause value characterizing the coordinated leave may be defined, which may e.g. be included in the SCG failure information. In other words, by including the cause value characterizing a coordinated leave, the terminal device 10 may signal to the network device 20 that e.g. there is no link deterioration, but that a coordinated leave e.g. due to the resource release request (block 300 of FIG. 4) is desired.

According to some embodiments, the terminal device 10 need not include any measurement in the SCG failure information message according to some accepted specifications, as the SCG failure information message is used for indicating the coordinate leave purpose, e.g. using the cause value, and not as an indication of link deterioration, e.g. of a secondary cell group.

Figure 5:
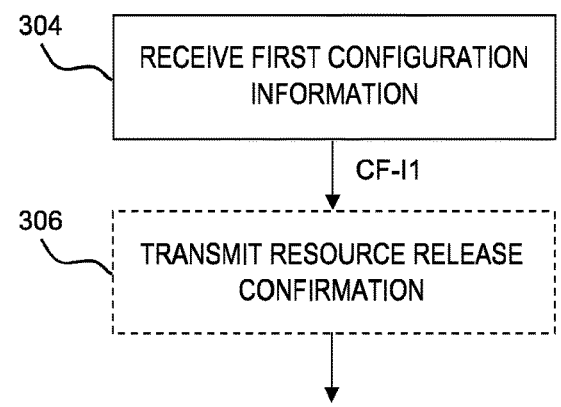

According to some embodiments, FIG. 5, the instructions 106 (FIG. 1), when executed by the at least one processor 102, further cause the terminal device 10 (FIG. 3) to receive 304 a first configuration information CF-I1, e.g. from the network device 20 (FIG. 3), which may e.g. be a master node of a multi-radio dual connectivity (MR-DC) via E-UTRA-NR Dual Connectivity (EN-DC), the first configuration information CF-I1 characterizing a reconfiguration of a bearer associated with the terminal device.

According to some embodiments, the network node 20, e.g. master node, may trigger a bearer remapping, i.e. "pull back", e.g. of secondary cell group (SCG) bearers to a master cell group, MCG, e.g., single connectivity, e.g. to avoid an interruption of an ongoing service. In some embodiments, information related to the bearer remapping may be signaled to the terminal device 10 by the master node 20 using the first configuration information CF-I1.

According to some embodiments, the network node 20, e.g. master node, may additionally suspend the secondary cell group. In some embodiments, information related to the suspension of the secondary cell group may be signaled to the terminal device 10 by the master node 20 using the first configuration information CF-I1.

According to some embodiments, after receipt 304 of the first configuration information CF-I1, the terminal device 10, e.g. its second USIM 10-2 (FIG. 3) may transmit to the first USIM 10-1 a resource release confirmation, see block 306 of FIG. 5, e.g. based on the first configuration information CF-I1.

Figure 6:
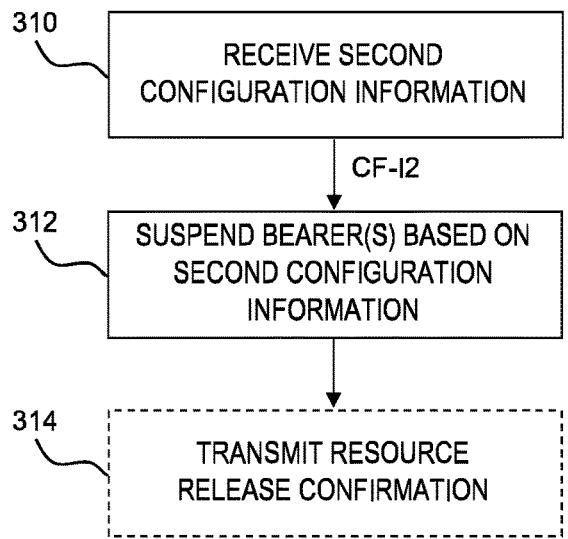

According to some embodiments, the master node 20 may not be able to perform a bearer remapping from the secondary cell group to the master cell group, e.g. due to resource constraints (or priority traffic expected on the secondary cell group and/or any other network internal reason). According to some embodiments, the master node 20 may, e.g. instead of the bearer remapping, indicate to the terminal device 10 to continue with the secondary cell group of a current EN-DC connection, e.g. with the master cell group being suspended. In some embodiments, the indication to the terminal device 10 to continue with the secondary cell group of a current EN-DC connection may be signaled to the terminal device 10 by the master node 20 using a second configuration information CF-I2, see for example FIG. 6 explained below. According to some embodiments, FIG. 6, the instructions 106 (FIG. 1), when executed by the at least one processor 102, further cause the terminal device 10 to receive 310 the second configuration information CF-I2 instructing the terminal device 10 to suspend at least one bearer associated with a master cell group, and to suspend 312 the at least one bearer associated with the master cell group based on the second configuration information CF-I2.

According to some embodiments, and e.g. similar to block 306 of FIG. 5, the terminal device 10, e.g. its second USIM 10-2, may, e.g. upon receipt 310 (FIG. 6) of the second configuration information CF-I2, and/or upon suspension 312 of the at least one bearer associated with the master cell group, transmit a resource release confirmation 314 to the first USIM 10-1.

Figure 7:
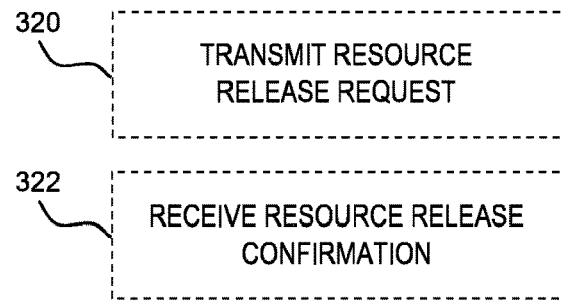

According to some embodiments, FIG. 7, the instructions 106, when executed by the at least one processor 102, further cause the first subscriber identity module, e.g. USIM 10-1, of the terminal device 10 to perform at least one of a) transmit 320 a or the resource release request to the second subscriber identity module, e.g. USIM 10-2, of the terminal device 10, b) receive 322, a resource release confirmation from the second subscriber identity module, e.g. USIM 10-2, of the terminal device 10.

As mentioned above, according to some embodiments, the terminal device 10 may, upon receipt 300 (FIG. 4) of the resource release request to the second subscriber identity module 10-2 of the terminal device 10, transmit the coordinated leave information CL-I according to the embodiments, see block 302 of FIG. 4.

As mentioned above, according to some embodiments, the terminal device 10 may, upon receipt 304 (FIG. 5) of the first configuration information CF-I1, transmit, see block 306 of FIG. 5, the resource release confirmation to the first subscriber identity module 10-2 of the terminal device 10, e.g. signaling that the respective resources have been released and may e.g. be used by the first subscriber identity module 10-1.

Further embodiments (FIG. 4) relate to a method of operating a terminal device 10 (FIG. 3), e.g. UE, which is configured to support multi-radio dual connectivity, MR-DC, with at least two different connections, comprising: transmitting 302 to a network device 20, e.g. a master node, a coordinated leave information CL-I indicating that at least one of the two different connections C1, C2 should be released.

Figure 10:
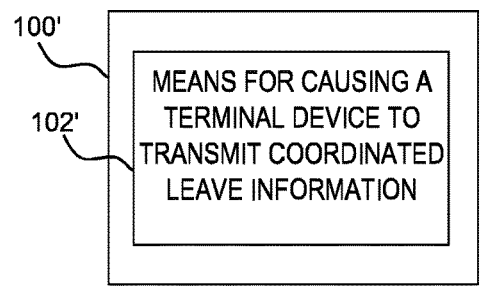

Further embodiments, see for example FIG. 10, relate to an apparatus 100' comprising means 102' for causing a terminal device 10 (FIG. 3), e.g. UE, which is configured to support multi-radio dual connectivity, MR-DC, with at least two different connections C1, C2 at least to: transmit 302 (FIG. 4) to a network device 20, e.g. a master node, a coordinated leave information CL-I indicating that at least one of the two different connections C1, C2 should be released.

In some embodiments, the means 102' may e.g. comprise at least one processor 102 (FIG. 1), and at least one memory 104 storing instructions 106, wherein e.g. the at least one memory 104 and the instructions 106 are configured to, with the at least one processor 102, perform aspects and/or steps of the method according to the embodiments.

Figure 2:
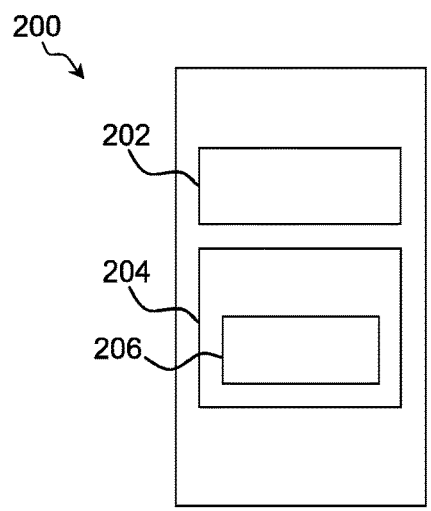

Further embodiments, see for example FIG. 2, relate to an apparatus 200, comprising at least one processor 202, and memory 204 storing instructions 206 that, when executed by the at least one processor 202, cause a network device 20 (FIG. 3), e.g. master node of an exemplary EN-DC connection, at least to: receive 350 (FIG. 8) a coordinated leave information CL-I indicating that at least one of two different connections C1, C1 of a terminal device, which is configured to support multi-radio dual connectivity with the least two different connections, should be released. As an example, the master node 20 may receive the coordinated leave information CL-I from the terminal device 10 of FIG. 3.

Figure 8:
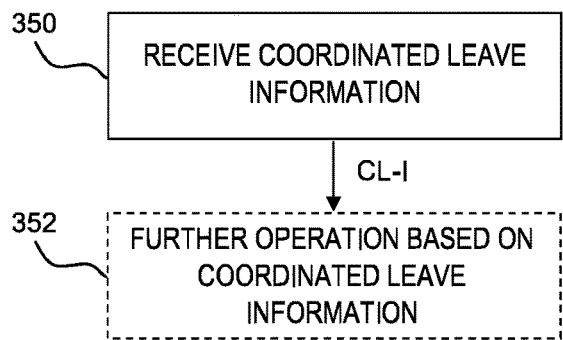

In some embodiments, the master node 20 may perform a further operation, see for example the optional block 352 of FIG. 8, based on the coordinated leave information CL-I as received in block 350.

Figure 9A:
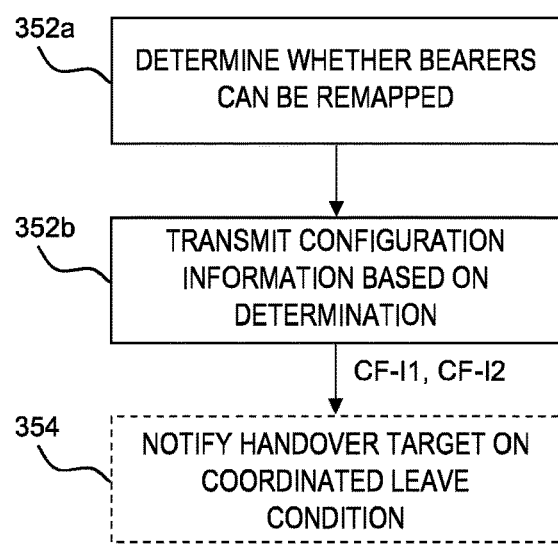

According to some embodiments, the instructions 206 (FIG. 2), when executed by the at least one processor 202, further cause the network device 20 to: determine 352a, FIG. 9A, whether bearers associated with a secondary cell group can be remapped to a master cell group, and, based on the determination 352a, transmit 352b to the terminal device 10 a first configuration information CF-I1 characterizing a reconfiguration of a bearer associated with the terminal device 10, e.g. if the bearers associated with the secondary cell group can be remapped to the master cell group, or a second configuration information CF-I2 instructing the terminal device 10 to suspend at least one bearer associated with a master cell group, e.g. if the bearers associated with the secondary cell group cannot be remapped to the master cell group.

According to some embodiments, the instructions 206, when executed by the at least one processor 202, further cause the network device 20 (FIG. 3) to: notify 354 (FIG. 9A) a handover target (not shown in FIG. 3) on a coordinated leave condition of the terminal device 10 based on the coordinated leave information. As an example, according to some embodiments, when the secondary cell group resources are relinquished, and if the master node 20 undergoes a handover, e.g. as a result of a master node layer mobility, while the secondary cell group is suspended for the coordinated leave according to some embodiments, the (source) master node 20 may inform and/or instruct the target master node of the handover to avoid a secondary cell group configuration during an inter-master node mobility execution, e.g. until the coordinated leave condition based on the coordinated leave information CL-I is revoked (e.g., a prohibition of not having secondary cell group resources for dual connectivity is active).

Figure 9B:
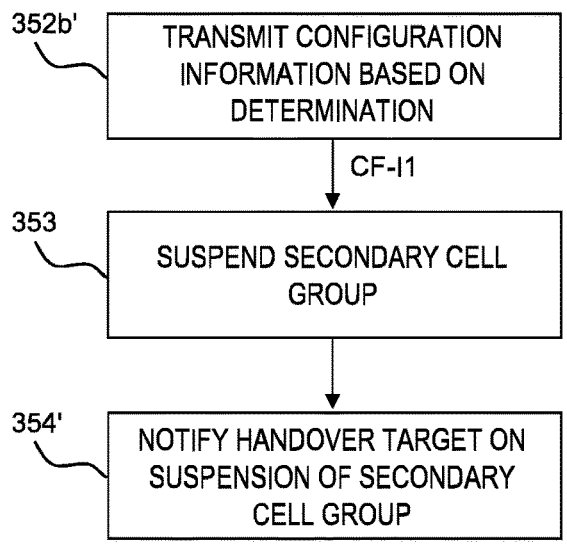

According to some embodiments, FIG. 9B, the instructions 206, when executed by the at least one processor 202, further cause the network device 20 (FIG. 3) to: transmit 352b' to the terminal device 10 the first configuration information CF-I1 characterizing a reconfiguration of a bearer associated with the terminal device 10, to suspend 353 the secondary cell group, and to notify 354' the handover target (e.g., target master node) on the suspension 353 of the secondary cell group.

As mentioned above, in some embodiments, the coordinated leave information CL-I may indicate to the network device 20 that a secondary cell group associated with at least one of the two different connections C1, C2 of the terminal device 10 should be suspended. However, according to some embodiments, upon receipt 350 of the coordinated leave information CL-I, the network device 20 may override this indication and may e.g. instead determine or decide to suspend a master cell group, see for example block 352 of FIG. 8.

Further embodiments relate to a method of operating a network device 20, e.g. master node, comprising: receiving 350 (FIG. 8) a coordinated leave information CL-I, e.g. from the terminal device 10, indicating that at least one of two different connections C1, C2 of the terminal device 10, which is configured to support multi-radio dual connectivity with the least two different connections C1, C2, should be released.

Figure 11:
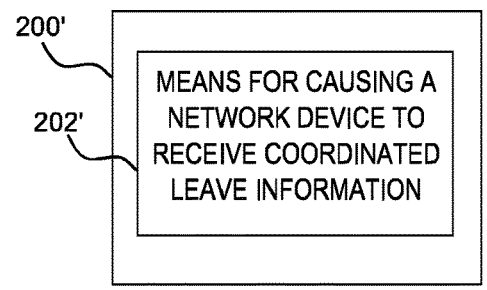

Further embodiments, see for example FIG. 11, relate to an apparatus 200' comprising means 202' for causing a network device 20 (FIG. 3), e.g. a master node of an EN-DC connection, at least to: receive 350 (FIG. 8) a coordinated leave information CL-I, e.g. from the terminal device 10, indicating that at least one of two different connections C1, C2 of the terminal device 10, which is configured to support multi-radio dual connectivity with the least two different connections C1, C2, should be released.

In some embodiments, the means 202' may e.g. comprise at least one processor 202 (FIG. 2), and at least one memory 204 storing instructions 206, wherein e.g. the at least one memory 204 and the instructions 206 are configured to, with the at least one processor 202, perform aspects and/or steps of the method according to the embodiments.

Further embodiments relate to a system 1, see for example FIG. 3, comprising at least one apparatus 100, 100' for a terminal device 10 according to the embodiments and at least one apparatus 200, 200' for a network device 20 according to the embodiments.

Figure 12:
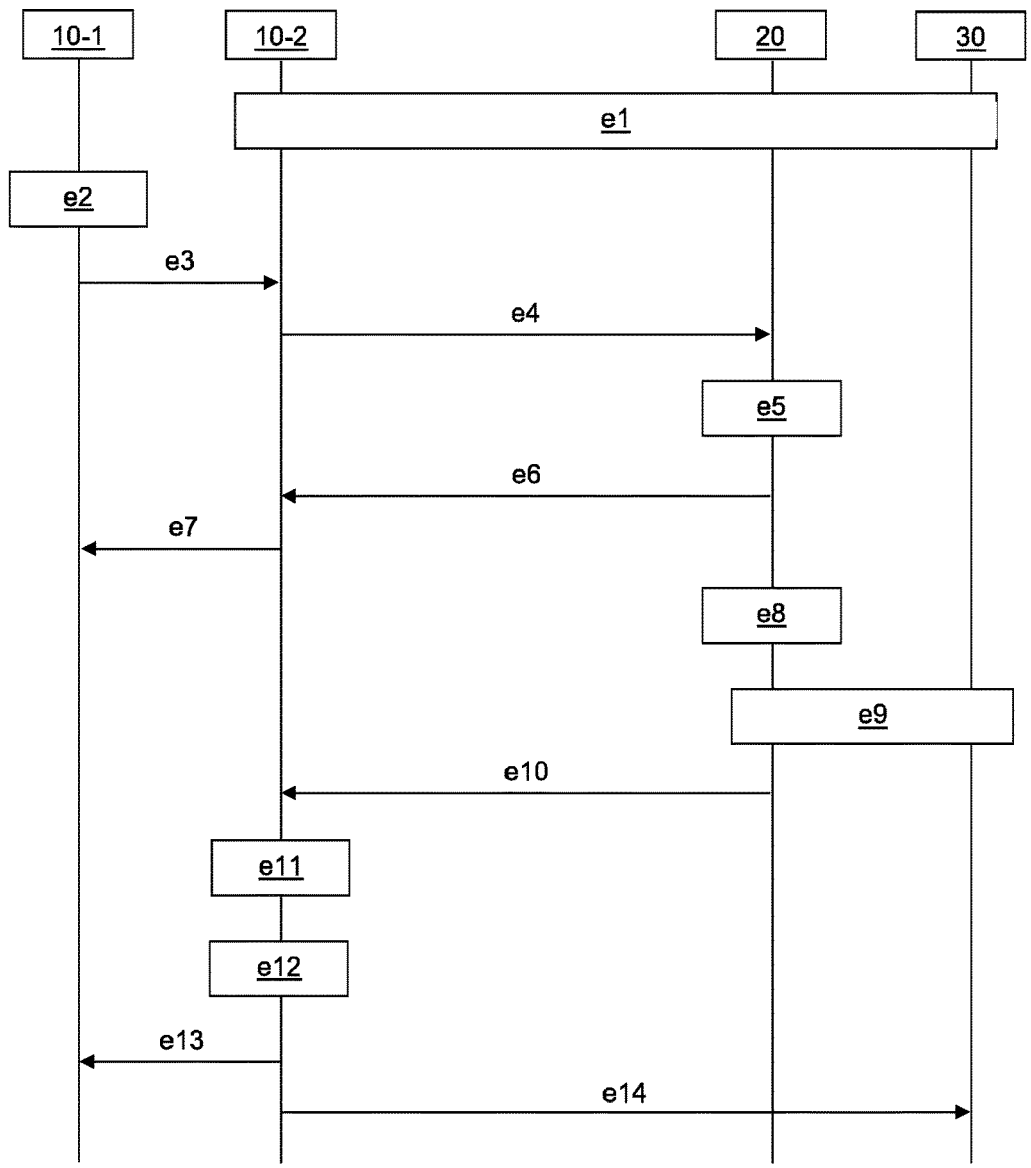

FIG. 12 schematically depicts a simplified signaling chart according to some embodiments. Block 10-1 symbolizes a first USIM 10-1 (also see FIG. 3, for example) of a terminal device 10 configured to support multi-radio dual connectivity with at least two different connections C1, C2, e.g. according to an EN-DC scheme, wherein E-UTRAN supports MR-DC via E-UTRA-NR Dual Connectivity. Block 10-2 symbolizes a second USIM 10-2 of the terminal device 10. Block 20 symbolizes a master node of the EN-DC scheme, and block 30 symbolizes a secondary node 30 of the EN-DC scheme.

According to some embodiments, based on the two USIMs 10-1, 10-2, the terminal device 10 may also be denoted as a "dual USIM device". According to some embodiments, the terminal device 10 may be connected to an LTE network via its first USIM 10-1 and by means of a NR-NSA connection via its second USIM 10-2, e.g. based on an EN-DC-LTE/NR dual connectivity as described in some accepted specifications.

According to some embodiments, the terminal device 10 is in an RRC connected state with the second USIM 10-2 in an EN-DC dual connectivity mode. Here, in some embodiments, the terminal device 10 may already use up its transceiver resources TRX, e.g. a dual transceiver, for the dual connectivity.

According to some embodiments, if the first USIM 10-1 intends to setup an radio resource control connection, then the second USIM 10-2 may need to suspend one of the cell groups used in dual connectivity, e.g. a Master Cell Group (MCG) or a Secondary Cell Group (SCG), e.g. to utilize/free up one transceiver resource TRX, e.g. one receiver (RX)/transmitter (TX) chain for the first USIM 10-1. In some embodiments, this can e.g. be signaled using the method according to the embodiments, e.g. transmitting 302 (FIG. 4) the coordinated leave information CL-I.

In this regard, FIG. 12 exemplarily depicts a connected mode with dual connectivity of the second USIM 10-2, see element e1 of FIG. 12. Block e2 symbolizes that the first USIM 10-1 determines or decides to start a radio resource control connection, and block e3 symbolizes a resource release request which is e.g. internally (with respect to the terminal device 10) transmitted from the first USIM 10-1 to the second, currently (dual) connected, USIM 10-2.

Block e4 of FIG. 12 symbolizes an exemplary transmission of the coordinated leave information CL-I (FIG. 302) from the terminal device 10, e.g. the second USIM 10-2, to the master node 10, e.g. indicating a coordinated leave. In other words, according to some embodiments, the terminal device 10 may use the coordinated leave information CL-I to propose to the master node 20 e.g. to relinquish a secondary cell group.

In some embodiments, the transmission e4 may e.g. comprise using a secondary cell group failure information message ("SCG-Failure-Information"), e.g. a SCG failure information according to some accepted specifications, which may optionally include a cause value characterizing the coordinated leave, thus e.g. enabling the master node 20 to distinguish the coordinated leave information CL-I from e.g. other types of secondary cell group failure information messages, e.g. being associated with different cause values.

According to further embodiments, the cause value may be forwarded by the master node 20 to the secondary node 30, e.g. using a radio resource control signaling, e.g. a radio resource control transfer message according to some accepted specification.

In some embodiments, the transmission e4 may use another message or type of signaling, such as e.g. radio resource control signal (e.g., a newly defined message) signaling or other type of signaling enabling to notify the master node 20 of the coordinated leave condition.

According to further embodiments, upon receipt of the coordinated leave information CL-I in transmission e4, in block e5, the master node 20 may determine that bearers associated with the secondary cell group can be remapped to a master cell group. Accordingly, the master node transmits first configuration information CF-I1 indicating that the bearers associated with the secondary cell group can be remapped to a master cell group to the terminal device 10, e.g. the second USIM 10-2. Block e6 exemplarily symbolizes the transmission of the first configuration information CF-I1.

According to further embodiments, e.g. after or upon receipt of the transmission e6 of the first configuration information CF-I1, the terminal device 10, e.g. its second USIM 10-2, may transmit (e.g., internally) a resource release confirmation e7, to the first USIM 10-1, which e.g. indicates to the first USIM 10-1 that some transceiver resources TRX are now available for use by the first USIM 10-1.

According to further embodiments, if the master node 20 determines, see for example block e8 of FIG. 12, that the bearers associated with the secondary cell group cannot be remapped to the master cell group, the master node 20 may transmit second configuration information CF-I2 to the terminal device 10, e.g. the second USIM 10-2, see for example block e10, instructing the terminal device 10 to suspend at least one bearer associated with the master cell group.

According to further embodiments, e.g. prior to transmitting e5 the second configuration information CF-I2 to the terminal device 10, the master node 20 may send a handover preparation information, see block 29, to the target master node, the handover preparation information e.g. notifying the target master node on a potential future handover.

In other words, according to some embodiments, the master node 20 may notify via block e9 (FIG. 12) a handover target 30 on a coordinated leave condition of the terminal device 10 (e.g., its second USIM 10-2) based on the coordinated leave information CL-I (see for example block e4). As an example, according to some embodiments, when the secondary cell group resources are relinquished, and if the master node 20 undergoes a handover, e.g. as a result of a master node layer mobility, while the secondary cell group is suspended for the coordinated leave according to some embodiments, the (source) master node 20 may inform and/or instruct the target master node of the handover to avoid a secondary cell group configuration during an inter-master node mobility execution, e.g. until the coordinated leave condition based on the coordinated leave information CL-I is revoked (e.g., a prohibition of not having secondary cell group resources for dual connectivity is active).

According to some embodiments, e.g. in response to an SCG-Failure-Information e4 from the terminal device 10, the master node 20 can respond to the terminal device 10 with an alternative "MCG-suspend message" e10 to suspend the MCG leg for freeing up transceiver resources, e.g. with a specific timer for the terminal device 10 to resume dual connectivity (for example, here the SCG continues normal operation but this is single radio leg operation) or until SCG mobility requires it (e.g. SCG mobility requiring intervention of the master node 20).

According to some embodiments, e.g. if the terminal device 10 does not resume the dual connectivity within a specific duration as e.g. characterized by the specific timer (e.g. denoted as "T_SUSPEND"), the network on the EN-DC may release the suspended master cell group and release the RRC connection or the terminal device 10 may handover the RRC connection from the master cell group to the secondary cell group.

In some embodiments, the specific timer, which may e.g. be denoted as "T_SUSPEND", may be signaled to the UE 10, e.g. in the second configuration information CF-I2. In some embodiments, the specific timer may indicate to the UE 10 a maximum duration the master cell group may remain suspended. Within the network, this specific timer e.g. allows the network to take a further action, e.g. to release the RRC connection, or the terminal device 10 may handover the RRC connection from the master cell group to the secondary cell group. In some embodiments, within the UE 10, the USIMs 10-1, 10-2 may coordinate to release the transceiver resource to resume the master cell group.

According to some embodiments, in block e11, the terminal device 10 may e.g. suspend the MCG bearer(s) and resume the SCG.

According to some embodiments, block e12 symbolizes an expiry of the specific timer for the release of resources associated with the first USIM 10-1, e.g. for resume dual connectivity.

According to some embodiments, block e13 symbolizes a resource release confirmation to the first USIM 10-1, e.g. similar to block e7 explained above.

According to some embodiments, element e14 symbolizes a message from the terminal device 10, e.g. its second USIM 10-2, to the secondary node 30, the message e14 e.g. indicating that a radio resource control reconfiguration is complete.

In some embodiments, e.g. upon a release of a connection of the second USIM 10-2, the terminal device 10 may inform via the master node radio link for a reactivation of SCG to enable the network resuming the dual connectivity operation on the given USIM 10-2. In some embodiments, e.g. in case if the MCG was suspended prior to the second USIM connection, the terminal device 10 may inform via the secondary node 30 for resuming the MCG.

Figure 13:
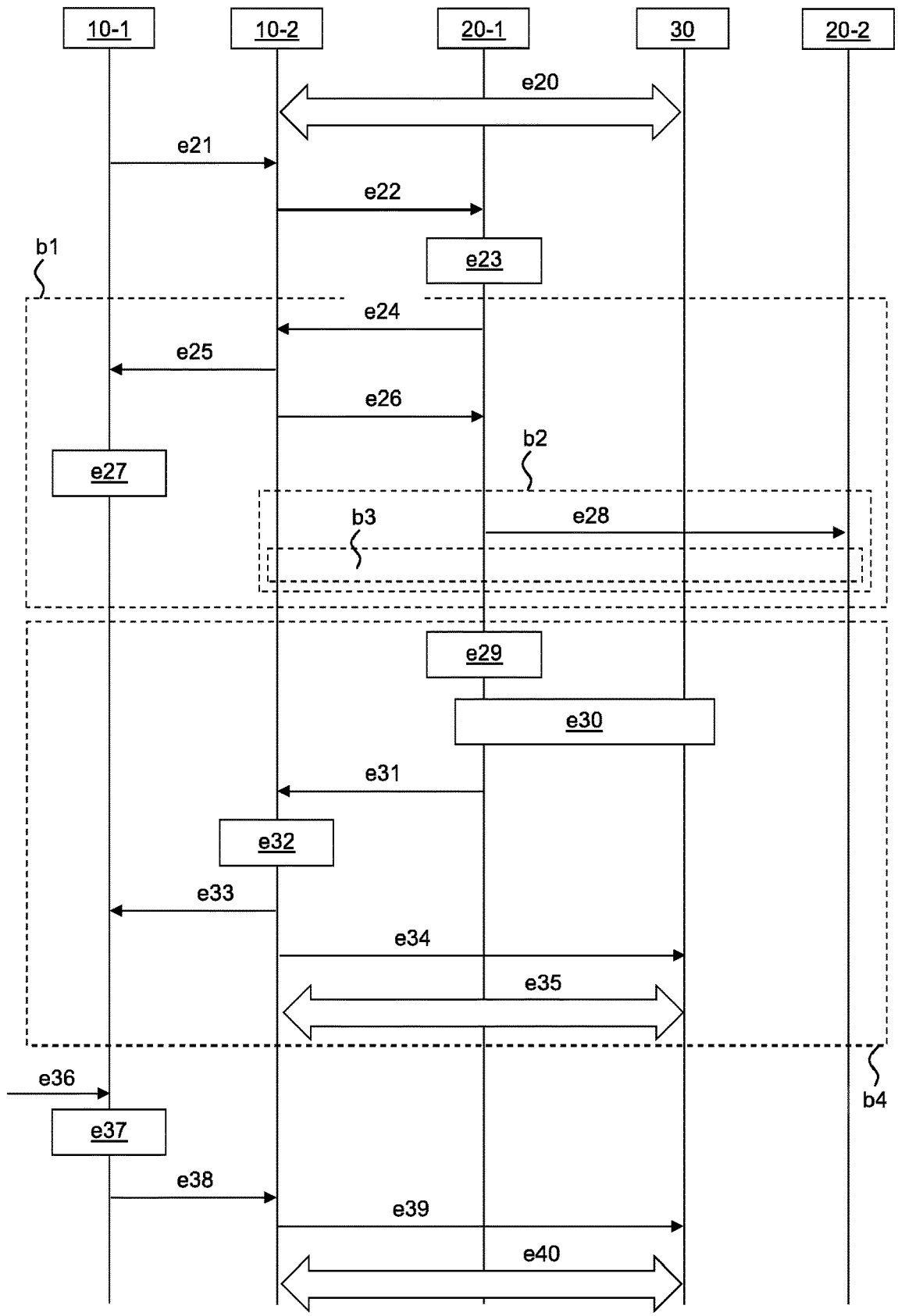

FIG. 13 schematically depicts a simplified signaling chart according to some embodiments. Similar to FIG. 12, block 10-1 symbolizes a first USIM 10-1 (also see FIG. 3, for example) of a terminal device 10 configured to support multi-radio dual connectivity with at least two different connections C1, C2, e.g. according to an EN-DC scheme, wherein E-UTRAN supports MR-DC via E-UTRA-NR Dual Connectivity. Block 10-2 symbolizes a second USIM 10-2 of the terminal device 10. Block 20-1 symbolizes a source master node of the EN-DC scheme, block 20-2 symbolizes a target master node, and block 30 symbolizes a secondary node 30 of the EN-DC scheme.

According to some embodiments, double block arrow e20 symbolizes that a MUSIM UE 10 (FIG. 3) has a second USIM 10-2 with an EN-DC subscription and is in RRC_connected state with a LTE-NR dual connectivity. As an example, an RRC connection may be desired for the first USIM 10-1 (e.g., to retrieve some information from an associated public land mobile network), which desire may e.g. be signaled by transmitting a resource release request e21 from the first USIM 10-1 to the second USIM 10-2.

In some embodiments, the UE 10 may transmit, e.g. via its second USIM 10-2, the coordinated leave information CL-I e22 (also see FIG. 4) to the source master node 20-1, the coordinated leave information CL-I e.g. indicating to the source master node 20-1 that a coordinated leave of the UE'S second USIM 10-2 is desired. As an example, the coordinated leave information e22 may be transmitted in the form of an SCG-Failure Information (e.g., according to some accepted specification), e.g. with a "new" cause (the cause e.g. indicating the desired coordinated leave to e.g. suspend SCG), e.g. before the UE 10 starts a new connection for the first, e.g. LTE, USIM 10-1, and awaits a response.

According to some embodiments, block e23 symbolizes a network reaction for the coordinated leave. As an example, on receiving the SCG-Failure Information for coordinated leave e22, the network node 20-1 in block e23 attempts for bearer remapping of the SCG traffic to MCG.

According to further embodiments, e.g. according to a first alternative, see for example block b1 of FIG. 13, if the bearer remapping is possible, the network node 20-1 transmits a first configuration information CF-I1, see the arrow e24, to the UE 10, e.g. the second USIM 10-2. In some embodiments, the first configuration information e24 may comprise an SCG-suspend (SCG-dormant) message via an MCG, e.g. using an RRC message or a MAC message, e.g. as a response to the message e22.

In some embodiments, element e25 symbolizes a resource release confirmation from the second USIM 10-2 to the first USIM 10-1, e.g. after receipt of the first configuration information e24.

In some embodiments, element e26 symbolizes an RRC complete message from the second USIM 10-2 to the source master node 20-1.

In some embodiments, element e27 symbolizes the first USIM 10-1 establishing the desired connection, e.g. to its associated PLMN.

In some embodiments, block b2 of FIG. 13 symbolizes that an inter-master node handover is triggered, e.g. from the source master node 20-1 to the target master node 20-2, wherein element e28 exemplarily symbolizes a respective handover request.

In some embodiments, as a SCG suspension is ongoing, see for example block b3, the inter-master node handover may not be able to add SCG and this may, according to further embodiments, be signaled to the UE 10 (not shown), e.g. as well to prevent it from reporting measurements on the secondary node's frequencies, e.g. until a condition to resume comes further in time.

According to further embodiments, e.g. according to a second alternative, see for example block b4 of FIG. 13, the master node 20-1 may determine that a bearer remapping is not possible, see block e29.

In some embodiments, see block e30, the master node 20-1 may transfer master node terminated bearers to the secondary node 30.

In some embodiments, if, e.g. according to block e29, the bearers cannot be remapped from SCG to MCG due to e.g. an on-going voice-call or critical traffic, the network may indicate to the UE 10 to suspend-MCG instead as response e31 to the SCG-Failure with e.g. cause suspend-SCG (or coordinated leave) e22 from the UE 10.

According to some embodiments, the network 20-1 may send another indication later if the MCG can be resumed by suspending SCG after this critical traffic (e.g., in both cases the UE 10 may continue in single connectivity).

In some embodiments, see block e32, the UE 10, e.g. its second USIM 10-2, may suspend the MCG bearers as instructed by element 31, and may e.g. continue with an updated RRC mapping with SCG terminated bearers and suspended master cell group, also see the double block arrow e35.

In some embodiments, see element e33, e.g. similar to element e25, a resource release confirmation e33 is sent from the second USIM 10-2 to the first USIM 10-1, and with element e34 the second USIM 10-2 sends an RRC complete message to the secondary node 30.

In some embodiments, the UE 10 may respond to a "MCG-Suspend" indication e31 from the network, e.g. master node 20-1 as follows. Instead of suspending SCG, the UE 10 may suspend MCG and may proceed with another USIM connection.

Additionally, in some embodiments, the specific ("T_SUSPEND") timer may be signaled to the UE 10 in element e31 and may e.g. indicate to the UE 10 a maximum duration the master cell group may remain suspended. Within the network, this specific timer e.g. allows the network to take a further action to release the RRC connection, or the terminal device 10 may handover the RRC connection from the master cell group to the secondary cell group. In some embodiments, within the UE 10, the USIMs 10-1, 10-2 may coordinate to release the transceiver resource TRX to resume the master cell group.

In some embodiments, see block e32, the UE 10, e.g. its second USIM 10-2, may suspend the MCG bearers as instructed by element e31, and may e.g. continue with an updated RRC mapping with SCG terminated bearers and suspended master cell group, also see the double block arrow e35.

In some embodiments, after transmission of the elements e33, e34, the first USIM 10-1 may be used, e.g. for a given period of time.

According to some embodiments, element e36 may represent a call release of the first USIM 10-1, so that e.g. the transceiver resources used by the first USIM 10-1 may be released, e.g. for use of the second USIM 10-2. For example, in block e37, the first USIM 10-1 informs the second USIM 10-2 that the transceiver resources are now free, also see the element e38, indicating e.g. a "resource available" message.

According to some embodiments, the UE 10, e.g. the second USIM 10-2, notifies the network (e.g. secondary node 30) by element e39 that the dual connectivity can be resumed (either in the abovementioned alternatives 1 or 2, see e.g. blocks b1, b4, the SCG or MCG can be resumed respectively). Hence, in some embodiments, the double block arrow e40 symbolizes a resumption of the dual connectivity, e.g. based on the notification e39.

According to some embodiments, another option of retaining the SC may be preferred by the network, wherein the UE 10 may get a SCG-suspend indication via the SCG, e.g. when the network is ready to switch the traffic back to the MCG. The UE 10 resumes the MCG followed by suspension of the SCG.

According to some embodiments, a further option, which is not depicted by FIG. 13, relates to not resuming the dual connectivity (e.g., at all), as e.g. the second USIM 10-2 may not yet have finished its session, so the UE 10 could e.g. continue staying in single connectivity, i.e. with one radio leg operating.

An advantage of some embodiments is enablement of a coordinated leave from a Multi-Radio Dual Connectivity connection, e.g. to initiate an RRC connection to another USIM 10-1 of a MUSIM device 10. In some embodiments, an existing RRC connection need not be released to enable a further USIM 10-1 to at least temporarily use transceiver resources TRX of the UE 10. In some embodiments, the UE 10 may request for a release of one Dual Connectivity connection of an USIM 10-2, e.g. to proceed with an RRC connection of another USIM 10-1 of the MUSIM UE 10. Further embodiments enable the network, e.g. network device 20, to decide on a cell-group based on a traffic situation (e.g., release of MCG or SCG depending on the traffic situation). Some embodiments enable to handle a transition to a connected-connected mode operation for a MUSIM scenario with Dual Connectivity on one USIM 10-2 with minimum interruption to a user plane for an active connection.

What is claimed is:

1. An apparatus, comprising: at least one processor; and memory storing instructions that, when executed by the at least one processor, cause a terminal device user equipment (UE) comprising a first universal subscriber identity module (USIM) and a second USIM, which is configured to support multi-radio dual connectivity with at least two different connections a master node and a secondary node via two different radio access connections conforming to an E-UTRA-NR (Evolved Universal Mobile Telecommunications System Terrestrial Radio Access-New Radio) dual connectivity (EN-DC) scheme, to: establish, by the second USIM, a radio resource control (RRC) connection for dual connectivity with the master node and the secondary node, wherein the second USIM is subscribed to LTE-NR connectivity and is in an RRC_CONNECTED state: receive, at the second USIM, a resource release request from the first USIM, the request being internally transmitted within the UE, the request indicating that the first USIM intends to initiate a new RRC connection, prompting coordinated resource management; transmit to a network device comprising the master node, a coordinated leave information indicating that at least one of the two different connections should be released the secondary cell group (SCG) connection should be released to free transceiver resources for the first USIM, wherein the coordinated leave information comprises an SCG-Failure-Information message including a newly defined cause value distinguishing the message as a coordinated leave request; based on an attempt for bearer remapping of the SCG traffic to a master cell group (MCG) by the network device in response to the coordinated leave information, receive, at the second USIM, a configuration message from the master node indicating whether SCG bearers can be remapped to the MCG; based on determining bearer remapping is not possible, receive, at the second USIM, from the master node, a suspend instruction indicating suspension of at least one MCG bearer; receive a specific suspend timer ("T_SUSPEND") in the configuration message, the timer defining a maximum duration for which the MCG may remain suspended; upon expiration of the suspend timer or upon release of the first USIM's RRC connection, coordinate, between the first USIM and the second USIM, the reallocation of TRX resources to the second USIM; transmit, from the second USIM to the secondary node, an RRC reconfiguration complete message indicating resumption of the SCG connection; and resume, by the second USIM, dual connectivity with the master and secondary nodes, based on a resource available message from the first USIM and notification of dual connectivity resumption to the secondary node.

2. A method of operating a terminal device user equipment (UE) comprising a first universal subscriber identity module (USIM) and a second USIM, which is configured to support multi-radio dual connectivity with at least two different connections a master node and a secondary node via two different radio access connections conforming to an E-UTRA-NR (Evolved Universal Mobile Telecommunications System Terrestrial Radio Access-New Radio) dual connectivity (EN-DC) scheme, the method comprising: establishing, by the second USIM, a radio resource control (RRC) connection for dual connectivity with the master node and the secondary node, wherein the second USIM is subscribed to LTE-NR connectivity and is in an RRC_CONNECTED state: receiving, at the second USIM, a resource release request from the first USIM, the request being internally transmitted within the UE, the request indicating that the first USIM intends to initiate a new RRC connection, prompting coordinated resource management; transmitting to a network device comprising the master node, a coordinated leave information indicating that at least one of the two different connections should be released the secondary cell group (SCG) connection should be released to free transceiver resources for the first USIM, wherein the coordinated leave information comprises an SCG-Failure-Information message including a newly defined cause value distinguishing the message as a coordinated leave request; based on an attempt for bearer remapping of the SCG traffic to a master cell group (MCG) by the network device in response to the coordinated leave information, receiving, at the second USIM, a configuration message from the master node indicating whether SCG bearers can be remapped to the MCG; based on determining bearer remapping is not possible, receiving, at the second USIM from the master node, a suspend instruction indicating suspension of at least one MCG bearer; receiving a specific suspend timer ("T_SUSPEND") in the configuration message, the timer defining a maximum duration for which the MCG may remain suspended: upon expiration of the suspend timer or upon release of the first USIM's RRC connection, coordinating between the first USIM and the second USIM, the reallocation of TRX resources to the second USIM; transmitting, from the second USIM to the secondary node, an RRC reconfiguration complete message indicating resumption of the SCG connection; and resuming, by the second USIM, dual connectivity with the master and secondary nodes, based on a resource available message from the first USIM and notification of dual connectivity resumption to the secondary node.

* * * * *